Aug. 19, 1941.  L. G. DANIELS  2,253,020
VALVE STRUCTURE
Filed Jan. 29, 1938  2 Sheets-Sheet 1
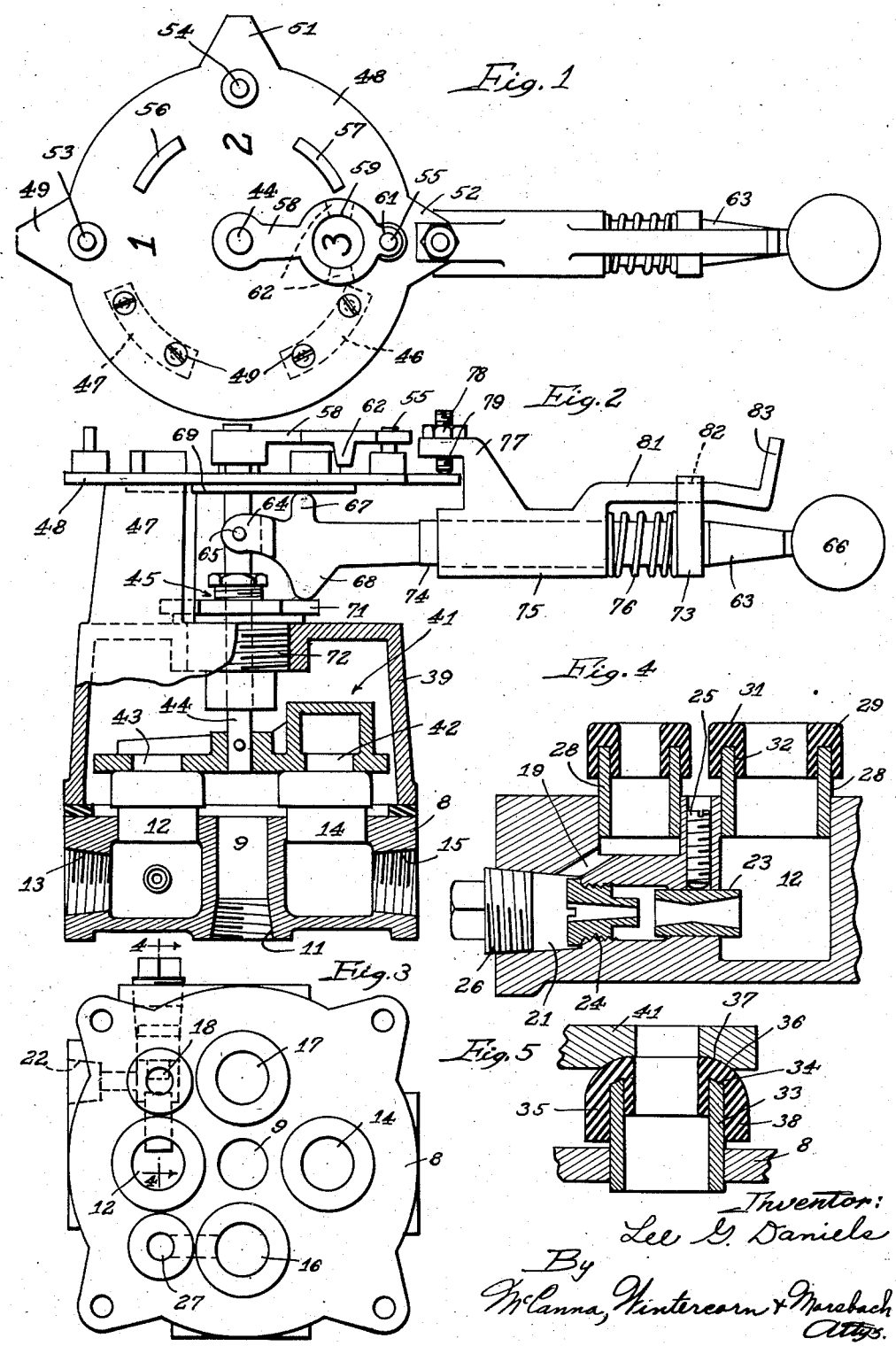
Inventor:
Lee G. Daniels
By
McCanna, Wintercorn & Marebach
Attys.

Aug. 19, 1941.   L. G. DANIELS   2,253,020
VALVE STRUCTURE
Filed Jan. 29, 1938   2 Sheets-Sheet 2

Inventor:
Lee G. Daniels
By
McCanna, Wintercorn & Morsbach
Attys.

Patented Aug. 19, 1941

2,253,020

UNITED STATES PATENT OFFICE 2,253,020

VALVE STRUCTURE

Lee G. Daniels, Rockford, Ill.

Application January 29, 1938, Serial No. 187,668

7 Claims. (Cl. 251—84)

This invention relates to valves and has special reference to a multiple port lift-turn type of valve of the general class described in my Patent 2,093,692, and in my copending application Serial No. 138,948, filed April 26, 1937.

An important object of the invention is the provision of a valve of the class described wherein the movable member of the valve is positively held in its various seated positions and cannot be unseated by surges or variations in pressure in the lines.

I have also aimed to provide a valve of the described class which may be easily adjusted during manufacture or in case the valve goes out of adjustment during service because of wear or for other reasons.

Another object of the invention is the provision of a valve which is easier to lift and turn than prior known valves of the same type and size.

A further object of the invention is the provision of a valve of the class described characterized by the absence of resilient means between the stem plate and the handle.

A still further object of the invention is the provision of a valve wherein improved sealing means is provided between the stationary and movable members of the valve.

Other objects and advantages will appear from the following description and the accompanying drawings, in which—

Figure 1 is a top view of a valve embodying my invention;

Fig. 2 is a side elevation of the valve showing a portion of the valve in section;

Fig. 3 is a face view of the ported body member showing the port arrangements;

Fig. 4 is a section on the line 4—4 of Fig. 3;

Fig. 5 is a fragmentary section through a modified form of port gasket showing portions of the cooperating body and rotor members;

Figure 6:
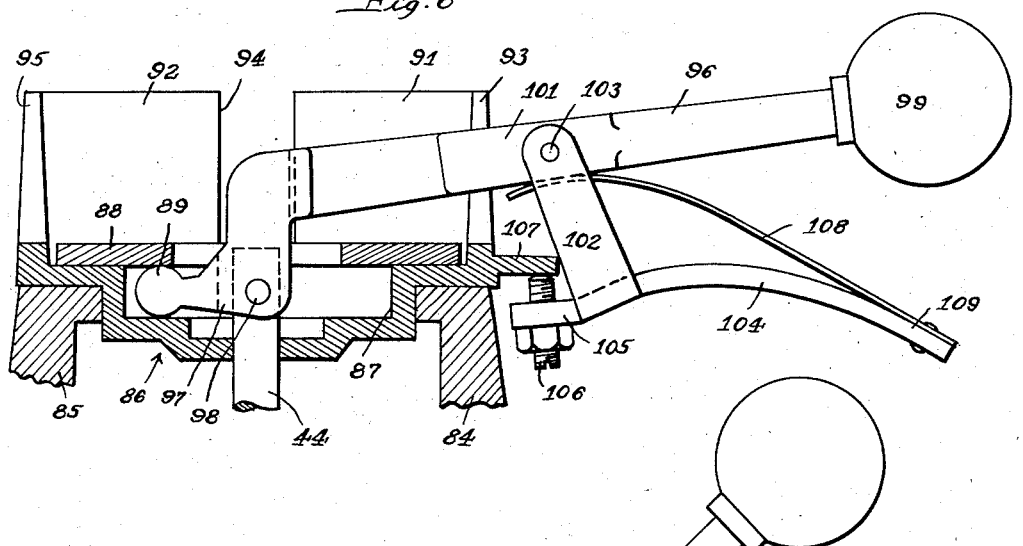
Fig. 6 is a section through a modified form of valve actuating mechanism.

Directing attention first to the form shown in Figs. 1 to 4, inclusive, the numeral 8 designates generally the stationary body or base member of the valve having a plurality of ports, in this instance arranged to control the flow of liquid in a zeolite water softener, a port 9 being connected through a threaded opening 11 to a source of water supply, a port 12 being connected to the incoming side of a zeolite softener, through a threaded opening 13, a port 14 being connected to the outlet from a zeolite water softener through a threaded opening 15, and ports 16 and 17, connected respectively to the service line and to drain through threaded openings such as those shown at 13 and 15. A port 18 is connected through a channel 19 to a bore 21. The bore 21 is connected to a brine tank or other source of brine supply through an opening 22 in the body member 8. Positioned in the bore 21 is a Venturi tube 23 and a jet 24 forming an injector for the purpose of withdrawing brine from the brine tank and conducting the same to the inlet of the softener by way of the port 12 and opening 13. The tube 23 is secured in position by means of a screw 25 and the opposite end of the bore 21 is closed by a plug 26. A port 27 is connected to the port 16 and serves to by-pass water to the service line during the back wash step of the regeneration cycle of the valve.

Positioned in each of the ports 12, 14, 16, 17, 18 and 27 are tubular ferrules designated generally by the numeral 28 arranged to seat to a predetermined depth within the ports. Positioned upon the outer ends of the ferrules 28 are sealing or gasket members 29 extending around and over the ferrules, formed of resilient rubber or similar material, each of the gaskets having a flat upper surface 31 and having an annular groove 32 in their lower surfaces for the reception of the outer end of the ferrules 28 (Fig. 4). The gaskets are retained on the ferrules in any of a number of well known ways, as, for example, by stretching the rubber of the gasket or by cementing the gasket thereon. Alternately the gasket and ferrules may be formed as shown in Fig. 5, wherein ferrules 33 are provided substantially similar to the ferrules 28, the outer ends thereof being beveled as shown at 34. Positioned on the ferrules are gaskets 35 of rubber or similar material, fastened as heretofore described. The upper or outer ends of the gaskets are curved convexly inwardly as shown at 36 so as to seat in curved concave recesses 37 in the stem plate or rotor member, as will presently be described, the recesses 37 surrounding each of the ports in the stem plate. In this instance the gasket is carried down along the outer side of the ferrules 33 as shown at 38 to a point in close proximity to the face of the body member 8 to impart better support under the seating pressure, to better retain the gasket on the ferrule and to serve as a further check to the passage of liquid on the interface between the gasket and the ferrule. This construction provides a somewhat better seal between the two ported members of the valve because of the manner in which the gasket distorts along the recesses under seating pressure to give a better seal, but on the other hand requires that the stem plate be seated more accurately than does the form of Fig. 4. It is also somewhat more expensive to manufacture than the former. Under some circumstances the portion of the gasket 35 which lies within the ferrules may be eliminated and the outer side 38 thereof carried down against the face of the body member to produce a satisfactory seal and likewise the portion thereof between the edge 34 and the stem plate may also be eliminated, the seal being produced by the inward pressure of the curved recesses 37.

Seated on the body member 8 is a housing or cover 39 which confines the flow of water to the ports and encloses a stem plate designated generally by the numeral 41 (Fig. 2). The stem plate 41 has a plurality of ports, certain of which are designated by the numerals 42 and 43, the position of which ports control the direction of flow through the valve, the stem plate being indexed for the purpose of establishing different communication between the ports of the plate and the ports of the body as described in my above-mentioned patent application. The stem plate 41 has a stem 44 projecting therefrom and extending out of the housing or cover 39 through a suitable packing arrangement designated generally by the numeral 45.

Positioned on the end of the housing 39 are spaced brackets 46 and 47 to the outer ends of which are attached an index plate 48 by means of screws or otherwise as shown at 49. The brackets 46 and 47 are in this instance integral with the housing 49 as will be apparent from Fig. 2. The index plate 48 has, in this instance, three outwardly extending projections 49, 51 and 52 on its periphery positioned at 90° angles and adapted to function in latching mechanism, as will presently be described. On the same radius with the projections are pins 53, 54 and 55 projecting upward from the surface of the plate at substantially equal distances from the center of the plate defined by the stem 44 which extends through the plate. Upstanding ribs 56 and 57 are likewise formed on the plate intermediate the pins 53, 54 and 55, as best shown in Figure 1, the ribs being arcuate and resting on the same radius. If desired, the numerals 1, 2 and 3 may be inscribed or formed on the plate opposite the pins for the purpose of designating the various valve positions.

Attached to the stem 44 on the outer side of the index plate is an arm 58 extending radially outward with respect to the plate and terminating slightly short of the periphery thereof, the arm having a larger opening as shown at 59 through which the numerals 1, 2 and 3 may be visible and a smaller opening 61 equi-distant from the center with the pins 53, 54 and 55 whereby the pins may be received in the opening 61 when the stem and rotor occupy the seated positions, one of which is shown in Fig. 2. Similar results may be obtained by placing the pins 53, 54 and 55 on the body within the housing and an ear on the stem plate having an opening or hole adapted to come into registration therewith in the same manner as the opening 61. Lugs 62 are positioned on the lower surface of the arm 58 on the same radius as the ribs 56 and 57 adapted to cooperate with the ribs in preventing the stem from being moved to the seated position of the rotor except at the designated stations.

A lever 63 having a forked end 64 is pivotally attached to the stem 44 by means of a bearing pin 65 which extends laterally outward from the stem and is journaled in the forked end 64. The outer end of the lever 63 has a ball 66 or other means for manually grasping the lever. Fulcrum projections 67 and 68 are positioned on the upper and lower sides of the lever 63 adjacent the forked inner end thereof and between the housing 39 and the index plate 48, as best shown in Fig. 2, the projections being so shaped and positioned that the projection 67 bears against a flat surface 69 on the lower side of the index plate 48 and against the flanged upper end 71 of the outer bushing 72 of the packing arrangement 45, this flanged end being sufficiently broad to provide bearing surface for the fulcrum projection at any position of the latter. Secured to the lever 63 is a collar 73 and a bearing surface 74 slidably carrying a sleeve 75 normally urged inward by means of a spring 76, the sleeve being slidable on the lever in the latching operation of the device. The sleeve 75 has an arm 77 which projects upwardly and inwardly into close proximity to the periphery of the index plate 48 in such manner as to move over the projections 49, 51 and 52 when the lever is indexed to a point therebeneath, as shown in Figs. 1 and 2. A screw and lock nut 78 is positioned in the arm 77 and is adjustable therein so that the lower end 79 thereof bears against the projections 49, 51 and 52 in the seated positions of the stem. A rod 81 projects outwardly along the lever 63, through an opening 82 in the collar 73, and is bent upwardly as shown at 83 to provide convenient means for actuation of the latch with the fingers, the finger being passed over the upwardly projecting portion 83 to move the sleeve 75 against the action of the spring 76 to withdraw the arm 77 and screw 78 from contact with the projections 49, 51 or 52.

The valve is operated as follows: Figs. 1 and 2 show the parts in the service position of the valve. In the regeneration of a zeolite water softener the operator grasps the handle 66 and with the finger moves the sleeve 75 to disengage the arm 77, whereupon the lever may be rotated in a clockwise direction facing Fig. 2 about the axis 65. During this movement the fulcrum projection 68 causes the stem 44 to be moved longitudinally, thus lifting the stem plate 41 free of the gaskets to an unseated position. This lifting movement of the stem causes the arm 58 to move upward until the arm is free of the pin 55, at which point the lever 63 may be indexed or rotated about the stem as an axis in a counterclockwise direction facing Figure 1 through 180° or until the numeral 1 on the index plate appears through the opening 59. During this movement the rib 57 and the lugs 62 prevent the stem from being moved downward to a position in which the rotor might engage the gaskets, that is, these elements retain the stem plate substantially in the unseated position until the lugs ride free of the rib 57 and the rotor approaches the No. 1 position, except for the short interval when the parts are passing the No. 2 position. The operator then adjusts the radial position of the lever 63 until the pin 53 is receivable in the opening 61, at which point the lever is rotated in a counterclockwise direction facing Fig. 2, whereupon the fulcrum projection 67 acts against the surface 69 to urge the stem longitudinally downward until the stem plate reaches the seated position in which it is pressed against the gaskets 29. When the screw 78 is properly adjusted, the latch may be released at this point and the screw will bear against the projection 51, thus positively locking the stem plate in its seated position. With the particular valve under consideration this will cause the direction of flow in the softener to be reversed to back-wash the softener and water to flow to the service line from the port 27, upon the completion of which operation the operator through movements similar to those just described, indexes the valve to the No. 2 position in which communication is established between the ports to draw brine into the softener when a supplementary brine valve is opened and to rinse out the brine from the softener upon the closing of the supplementary valve. When the rinsing operation is complete, the operator again actuates the valve moving it from the No. 2 position to the No. 3 position shown in the drawings, thus returning the softener to service. The brackets 46 and 47 serve as stops to limit the total amount of circumferential movement of the lever 63 to substantially 180°, though this may be varied as required in accordance with the port arrangement of the valve.

It will be seen that in this embodiment of the invention the fulcrum projections of the lever abut against parts 69 and 71 in the seated position of the valve, and the arrangement is such that the stem plate is positively retained on its seat. No resilient elements of any kind are embodied in the train of members which apply the pressure, and consequently it is impossible for the valve to be even momentarily unseated due to surges of pressure in the liquid such as the surges causing water hammer and the like. It should be noted that the hard water inlet 9 discharges directly against the lower surface of the stem plate which must deflect the flow for passage radially outward between the ferrules and gaskets into the upper part of the housing, and this renders the plate subject to such unseating. Furthermore, the stem plate occupies a position spaced from the surface of the body member when seated so that the water pressure is distributed over both sides of the plate, thus reducing to a minimum the force required to lift the plate. It will be noted that the ribs 56 and 57 and associated elements roughly locate the seating position of the stem and that the pins 53 to 55 accurately define this position and during the seating movement of the stem, guide the same into the accurately defined position. Attention is also directed to the fact that the seated position of the lever 63 is subject to easy and convenient adjustment through the screw 78 which permits of rapid and accurate adjustment at the time of manufacture and also facilitates adjustment in service should the adjustment become disturbed due to wear or other causes.

In Fig. 6 I have shown a modified form of mechanism for lifting, turning and seating the stem plate and for moving the stem through such movements. In this embodiment spaced brackets 84 and 85 are formed on the housing 39 and carry an indexing member designated generally by the numeral 86. The indexing member has a channel 87 which forms with a top plate 88 a raceway within which is confined the end 89 of an actuating lever presently to be described providing a fulcrum therefor. The index member has annular ribs 91 and 92 together with additional similar ribs not shown separated by recesses 93, 94 and 95 which define the seated positions of the valve, the ribs preventing movement of the valve into the seating position intermediate the defined positions and during indexing movement thereof. A lever 96 has the projecting end 89 and has spaced ears 97 adapted to receive the upper end of the stem 44, the stem being pivotally retained therein by means of a pin 98. The lever extends laterally outward and has a ball 99 or other handle for manual operation thereof. The lever 96 in this instance has a flattened portion 101 of such width as to be closely received in the recesses 93, 94 and 95 so as to accurately define the seating position. The portion 101 also carries spaced ears 102 pivotally connected to the lever by a pin 103, the ears supporting a latch lever 104 intermediate its ends, the inner end 105 of the latch lever having an adjusting screw and nut 106 adapted to underlie and bear against projections 107 projecting laterally outward from the index member at the base of each of the recesses 93, 94 and 95, the latch lever normally preventing the lever 96 from being moved so as to unseat the valve and likewise prevent upward movement of the stem in response to surges of pressure in the fluid entering the valve. A spring 108 is attached to the opposite end of the latch lever 104 as shown at 109 to normally retain the latch lever in the position shown in Fig. 6 but permitting the operator upon grasping the handle 99 to draw the latch lever toward the handle, thus rotating the lever about the pin 103 so that the end 105 and adjusting screw will clear the projections 107 thereby permitting the lever 96 to be raised out of the recesses 93, 94 and 95 for rotation of the stem 44 between the various valve positions.

Figure 7:
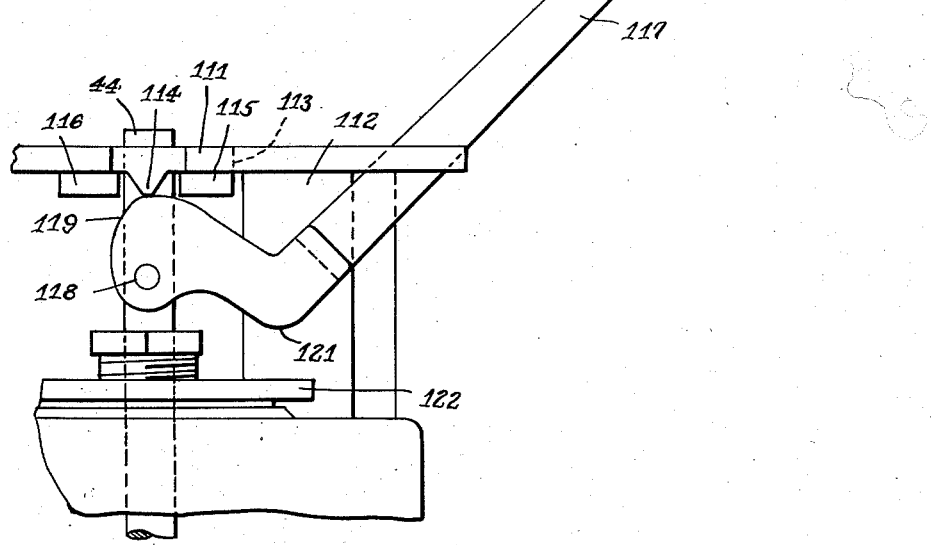
Fig. 7 is a fragmentary side elevation of a second modified form of valve actuating mechanism.

In the embodiment of the invention shown in Fig. 7, an index element 111 is positioned in spaced relation to the housing 39 by means of brackets 112 and has a plurality of slots 113 defining the seated position of the stem plate, the slots extending from the periphery of the element to a point near the center thereof, the element being arranged concentrically with respect to the stem 44. The lower surface of the element 111 has four depending cam lugs 114, 115, 116, and an additional lug, not shown, spaced 180° from the lug 114, spaced circumferentially of the element 111 adjacent the stem. A lever 117 is pivotally supported on a pin 118 on the stem, the end of the lever being forked to pass on opposite sides of the stem and having cam surfaces 119 and a fulcrum portion 121, the cam surfaces 119 engaging alternate cam lugs when the lever is moved to a seated position such as shown in Fig. 7, thus urging the stem longitudinally downward to seat the stem plate. The cam surfaces 119 and the lugs are so shaped that the lever is held in this position through frictional engagement of these elements. To unseat the stem plate the lever 117 is rotated about the pin 118 in a clockwise direction bringing the fulcrum 121 into contact with a flat surface 122 similar to the surface 71 shown in Fig. 2. Upon continued movement of the lever 117 the stem is moved longitudinally upward facing the figure, causing the stem plate to be lifted free of its seat. The lever 117 is then moved in a plane at right angles to Fig. 7 to index the stem between the various seating positions as defined by the slots 113. The periphery of the index element 111 prevents seating of the stem plate intermediate the designated positions. The valve is preferably mounted so that in the service position thereof or in the normal operating position the lever 116 projects upwardly and outwardly so that the force of gravity acting on the lever tends to move the same in a direction to seat the stem plate; in other words, in a counter-clockwise direction facing Fig. 7. In this way vibration of the valve and associated parts tends to better seat the stem plate rather than having the opposite effect.

It will be seen that in accordance with the invention I provide means in a valve of the lift-turn type for retaining the stem plate member positively against its seat in each of its positions so that the plate cannot be dislodged accidentally or through surges of pressure in the liquid. No springs or other resilient mechanism is provided and the plate is positively seated in response to movement of the handle and not resiliently seated by action of a spring as in numerous prior art constructions. This construction not only renders the action of the valve positive but materially reduces the power required to lift the stem plate. It furthermore avoids difficulties with springs such as corrosion and breakage, and permits the use of a smaller housing, thus reducing the overall dimensions and the cost of the valves. I also provide easy and convenient means for adjusting the seated position of the plate member both during the manufacture and to compensate for wear. In the form shown in Fig. 7 this compensation is automatically attained merely in response to movement of the operating lever to the seated position. It will be seen that this construction is much easier to operate, that is, it requires less power because the stem plate does not need to be unseated against resilient pressure heretofore required for holding the valve in its seated position. I have also provided improved sealing means between the multiple ported members of the valve which require substantially less space than those heretofore employed and are cheaper to manufacture. The gaskets are extremely easy to replace and do not tend to break up under the compressive force and the resultant distortion as by being distorted over sharp corners or edges. Furthermore, the metal surfaces between which sealing occurs (the upper ends of the ferrules and the face of the stem plate) are close together so that proper pressure can be built up without undue distortion of the rubber. In the form shown in Fig. 5, a certain amount of side support is placed on the gasket without there being sharp edges over which the gasket can be distorted and damaged. I have also provided improved means for locating the seating position of the plate and for guiding the plate accurately into its proper seating position.

I claim:

1. The combination in a lift-turn valve of a ported body member, a ported stem plate, a stem projecting from said plate for lifting, turning and seating the same to shift the ports thereof to different communicating positions with respect to said body member, a lever having a handle at one end and pivotally carried at its opposite end on said stem on an axis transverse thereto, fulcrum projections on the upper and lower sides of said lever between the pivot point and the handle positioned to abut against stationary parts of the valve to move the stem longitudinally, the upper of said projections abutting a stationary part to move said stem in seating movement and the lower projection abutting another stationary part to move said stem in unseating movement upon rotation of the lever on said transverse axis and adapted for sliding movement of the lower projection on said stationary parts for rotation of said stem, and means to latch the lever in the seated position thereof whereby said upper projection acts against said stationary parts to prevent unseating movement of the stem in response to variations of pressure within the valve.

2. The combination in a lift-turn valve of a ported body member, a ported stem plate, a stem projecting from said plate for lifting, turning and seating the same to shift the ports thereof to different communicating positions with respect to said body member, a valve housing enclosing said stem plate, an index plate spaced from said valve housing, a lever rotatably supported at one end on said stem between said housing and said index plate on an axis transverse to said stem, said lever having fulcrum projections intermediate its ends on opposed sides thereof, said index plate and said body having flat abutment surfaces for abutment by said projections to move said stem longitudinally and thereby seat and unseat the stem plate upon rotation of said lever on said axis between seating and unseating positions and to support said lever for rotation of said stem, said index plate having peripheral shape characteristics defining valve positions, and latch means on said handle positioned to effect locking engagement with said peripheral shape characteristics in the seated position of said handle.

3. The combination in a lift-turn valve of a ported body member, a ported stem plate, a stem projecting from said plate for lifting, turning and seating the same to shift the ports thereof to different communicating positions with respect to said body member, a valve housing enclosing said stem plate, an index plate spaced from said valve housing, a lever rotatably supported at one end on said stem between said housing and said index plate on an axis transverse to said stem, said lever having fulcrum projections intermediate its ends on opposed sides thereof, said index plate and said body having opposed surfaces for abutment by said projections to move said stem longitudinally and thereby seat and unseat the plate upon rotation of said lever on said axis between seating and unseating positions and to support said lever for rotation of said stem, said index plate having peripheral shape characteristics defining valve position, latch means on said handle positioned to effect locking engagement with said peripheral shape characteristics in the seated position of said handle, and means for adjusting the locked position of said lever to compensate for wear between the lever and the stem plate seat.

4. The combination in a lift-turn valve of a ported body member, a ported stem plate, a stem projecting from said plate for lifting, turning and seating the same to shift the ports thereof to different communicating positions with respect to said body member, a lever rotatably supported at one end on said stem on an axis transverse thereto, said lever having a cam intermediate its ends and a fulcrum projection on the opposite side thereof, a stationary part on said valve having a surface positioned for abutment by said projection to move said stem longitudinally in unseating movement upon rotation of said lever on said axis in one direction and to support said lever for rotation of said stem, a cam abutment element positioned for abutment by said cam to move said stem longitudinally in seating movement upon rotation of said lever on said axis in the opposite direction, said cam and abutment element being shaped to frictionally hold said stem in the seated position thereof against unseating pressure from within the valve.

5. The combination in a lift-turn valve of a ported body member, a ported stem plate, a stem projecting from said plate for lifting, turning and seating the same to shift the ports thereof to different communicating positions with respect to said body member, fixed abutment surfaces arranged in spaced relation concentric with said stem, a lever supported on said stem between said surfaces on an axis transverse to said stem rotatable with respect thereto between seated and unseated positions and rotatable with the stem about the axis of said stem to shift the plate between said different communicating positions, spaced fulcrum projections on the upper and lower sides of said lever positioned to abut said surfaces positioned above and below said lever upon rotation of the lever between said seated and unseated positions to move said stem longitudinally between its said positions and to slide over one of said surfaces with rotation of said stem, and means to hold said lever in the seated position thereof whereby said means and one of said projections prevents unseating movement of said lever.

6. The combination in a lift-turn valve of a ported body member, a ported stem plate, a stem projecting from said plate for lifting, turning and seating the same to shift the ports thereof to different communicating positions with respect to said body member, fixed abutment surfaces arranged in spaced relation concentric with said stem, a lever supported on said stem between said surfaces on an axis transverse to said stem rotatable with respect thereto between seated and unseated positions and rotatable with said stem about the axis of said stem to shift the plate between said different communicating positions, spaced fulcrum projections on the upper and lower sides of said lever positioned to abut said surfaces above and below said lever upon rotation of the lever between said seated and unseated positions to move said stem longitudinally between its said positions and to slide over one of said surfaces with rotation of said stem, and manually releasable latch means acting between said lever and a stationary part of the valve to hold the lever in the seated position to prevent unseating movement of said stem.

7. The combination in a lift-turn valve of a ported body member, a ported stem plate, a resilient gasket therebetween, a stem projecting from said plate for free movement through lifting, turning and seating movements to shift the ports thereof to different communicating positions with respect to said body member, a lever rotatably supported at one end on said stem on an axis transverse thereto, said lever having fulcrum projections intermediate its ends on opposite sides thereof, spaced stationary members on opposite sides of said lever positioned for selective abutment by said projections for manual movement of said stem longitudinally in seating and unseating movements upon rotation of said lever on said axis between unseated and seated positions and for manual compression of said gasket to a fixed degree upon movement to seated position, one of said members also serving to support said lever for sliding movement for rotation of said stem, and means acting between the lever and a stationary part of the valve for locking the lever in the seated position to retain said compression and to prevent unseating movement of the plate in response to variation in pressure thereon.

LEE G. DANIELS.